US010791452B2

(12) United States Patent
Hua et al.

(10) Patent No.: US 10,791,452 B2
(45) Date of Patent: Sep. 29, 2020

(54) PUBLIC SAFETY/SECURITY UE COMMUNICATION FRAMEWORK FOR PROSE VIA PRESENCE INFORMATION

(71) Applicant: Alcatel-Lucent USA Inc., Murray Hill, NJ (US)

(72) Inventors: Suzann Hua, Lisle, IL (US); Yigang Cai, Naperville, IL (US)

(73) Assignee: Alcatel Lucent, Boulogne-Billancourt (FR)

( * ) Notice: Subject to any disclaimer, the term of this patent is extended or adjusted under 35 U.S.C. 154(b) by 802 days.

(21) Appl. No.: 14/573,628

(22) Filed: Dec. 17, 2014

(65) Prior Publication Data

US 2016/0183040 A1 Jun. 23, 2016

(51) Int. Cl.
*H04W 8/00* (2009.01)
*H04W 4/90* (2018.01)
*H04L 29/08* (2006.01)

(52) U.S. Cl.
CPC ............. *H04W 8/005* (2013.01); *H04L 67/24* (2013.01); *H04W 4/90* (2018.02)

(58) Field of Classification Search
CPC ..... H04W 4/008; H04W 80/10; H04W 80/04; H04W 48/16
USPC .......................................................... 370/338
See application file for complete search history.

(56) References Cited

U.S. PATENT DOCUMENTS

2011/0161397 A1* 6/2011 Bekiares ................. H04L 67/24 709/203
2014/0056220 A1 2/2014 Poitau et al.
2014/0057667 A1* 2/2014 Blankenship ......... H04L 67/303 455/500
2014/0092885 A1 4/2014 Venkatachalam et al.
2014/0134974 A1 5/2014 Kuo
2014/0141777 A1 5/2014 Guo
2014/0348066 A1* 11/2014 Patel ................... H04W 76/005 370/328
2015/0043429 A1* 2/2015 Kim ...................... H04W 4/008 370/328

FOREIGN PATENT DOCUMENTS

CN 102687134 A 9/2012
JP 2009230562 A 10/2009
(Continued)

OTHER PUBLICATIONS

3GPP TR 22.803 v12.2.0 (Jun. 2013); 3rd Generation Partnership Project; Technical Specification Group Services and System Aspects; Feasibility study for Proximity Services (ProSe).
(Continued)

*Primary Examiner* — Muthuswamy G Manoharan
(74) *Attorney, Agent, or Firm* — Duft & Bornsen, PC

(57) ABSTRACT

An apparatus, e.g. a mobile computing device, directs presence information toward a presence server (PS). The presence information includes public-safety (PuSa) specific proximity-based services (ProSe) information. The apparatus also directs to the PS a request to subscribe to PuSa-specific ProSe information of a target ProSe presentity, the request including a dedicated PuSa service ID. The apparatus may discover user equipment (UE) of the target presentity only on the condition that the PS returns the presence information of the target presentity.

22 Claims, 6 Drawing Sheets

(56) References Cited

FOREIGN PATENT DOCUMENTS

| | | | |
|---|---|---|---|
| KR | 10-2012-0099148 | A | 9/2012 |
| KR | 10-2014-0128972 | A | 11/2014 |
| WO | 2013122374 | A1 | 8/2013 |
| WO | 2013191504 | A1 | 12/2013 |

OTHER PUBLICATIONS

3GPP Standard; 3GPP TR 23.703, 3rd Generation Partnership Project (3GPP), "3rd Generation Partnership Project; Technical Specification Group Services and System Aspects; Study on architecture enhancements to support Proximity-based Services (ProSe) (Release 12)", Mar. 10, 2014 (Mar. 10, 2014), pp. 1-324, vol. SA WG2, No. V2.0.0, Mobile Competence Centre, Sophia-Antipolis Cedex, France.

PCT/US2015/066357 Notification of Transmittal of The International Search Report and Written Opinion of the International Searching Authority, or the Declaration dated Apr. 6, 2016.

* cited by examiner

```
501 <?xml version="1.0" encoding="UTF-8"?>
505 <cr:ruleset xmlns="urn:ietf:params:xml:ns:pres-rules"
509 xmlns:cr="urn:ietf:params:xml:ns:common-policy">
513 <! – for subscription request from PuSa domain x or y, allow provide/notify PuSa-ProSe service -->
517 <cr:rule id="rule-1">
521         <cr:conditions>
525             <cr:identity>
529                 <cr:many>
533                     <cr: domain="domain-x"/>
537                     <cr: domain="domain-y"/>
541                 </cr:many>
545             </cr:identity>
549         </cr:conditions>
553         <cr:actions>
557             <sub-handling>allow</sub-handling>
561         </cr:actions>
565         <cr:transformations>
569             <provide-services>
573                 <service-description>
577                     <op:service-id>xxxx.PuSa-ProSe</op:service-id>
581                     <op:version>1.0</op:version>
585                 <service-description>
589             </provide-services>
593         </cr:transformations>
597 </cr:rule>
599 </cr:ruleset>
```

FIG. 5

PUBLIC SAFETY/SECURITY UE COMMUNICATION FRAMEWORK FOR PROSE VIA PRESENCE INFORMATION

TECHNICAL FIELD

The disclosure relates generally, but not exclusively, to wireless communications, e.g. communications between public safety providers using proximity services (ProSe).

BACKGROUND

This section introduces aspects that may help facilitate a better understanding of the inventions. Accordingly, the statements of this section are to be read in this light and are not to be understood as admissions about what is prior art or what is not prior art.

A Proximity-based Service (ProSe) architecture has been established, e.g. as specified in 3GPP TS 23.303. Additional enhancements of wireless communications interfaces have been proposed in 3GPP RAN1/RAN2 working groups, e.g. TR 22.803 and TR 36.843. However, existing and proposed ProSe standards do not adequately support Public Safety UE communication based on presence information.

SUMMARY

One embodiment provides an apparatus, e.g. a mobile computing device, or client, such as a smart phone. The apparatus includes a processor and a computer-readable nontransitory storage medium operably coupled to the processor. The storage medium includes instructions that when executed by the processor configure the processor to direct presence information toward a presence server (PS), wherein the presence information includes public-safety (PuSa) specific proximity-based services (ProSe) information. The ProSe information preferably includes a PuSa ProSe service identification (ID), geo-location data, and a timestamp. The processor is further configured to direct to the PS a request to subscribe to PuSa-Specific ProSe information of a target presentity, wherein the request includes a dedicated PuSa service ID. In some embodiments the processor is further configured to discover user equipment (UE) of the target presentity only on the condition that the PS returns the PuSa-specific ProSe information of the target presentity.

In some embodiments the processor is further configured to communicate with the UE directly via a radio-frequency (RF) link independent of a telecommunications network. The RF link may be via a dedicated public safety frequency. In some embodiments the processor is further configured to display a list or a map that indicates the presence of the target presentity. A communication with a UE may be initiated by actuation of a list or a map icon associated with the UE.

Another embodiment is a method, e.g. of manufacturing a mobile computing device. The method includes configuring a mobile computing device to direct presence information to a presence server, wherein the presence information includes PuSa-specific ProSe information. The mobile computing device is further configured to direct to the PS a request to subscribe to PuSa-Specific ProSe information of a target presentity, the request including a dedicated PuSa service ID.

Another embodiment is an apparatus, e.g. a ProSe presence server, including a processor and a computer-readable nontransitory storage medium operably coupled to the processor. The storage medium includes instructions that when executed by the processor configure the processor to receive presence information from a target UE, wherein the presence information includes PuSa-specific ProSe information regarding a ProSe target presentity. The apparatus receives, from a watcher UE of a watcher presentity, a request to subscribe to the presence information. The apparatus directs the presence information to the watcher UE on the condition that the watcher presentity is determined to be a PuSa ProSe user based on PuSa subscription rules.

In some embodiments the presence information includes an ID of the target presentity, a geo-location and/or a time stamp. The PuSa subscription rules may optionally be defined by XML code. The PuSa subscription rules may also include a definition of a service ID specific to authorized PuSa presentities. Furthermore the rules may include a definition of a service ID applicable to all normal commercial ProSe usage.

Another embodiment is a method, e.g. of manufacturing a ProSe presence server. The method includes configuring a server to receive, from a UE, presence information that includes PuSa-specific ProSe information regarding a ProSe target presentity. The server is further configured to receive, from a watcher UE of a watcher presentity, a request to subscribe to the presence information. The server is further configured to direct the presence information to the watcher UE on the condition that the watcher presentity is determined to be a PuSa ProSe user based on PuSa subscription rules.

Additional aspects of the invention will be set forth, in part, in the detailed description, figures and any claims which follow, and in part will be derived from the detailed description, or can be learned by practice of the invention. It is to be understood that both the foregoing general description and the following detailed description are examples and explanatory only and are not restrictive of the invention as disclosed.

BRIEF DESCRIPTION OF THE DRAWINGS

A more complete understanding of the present invention may be obtained by reference to the following detailed description when taken in conjunction with the accompanying drawings wherein:

FIG. 5 illustrates a rule set that may be employable in various embodiments by the ProSe server of FIG. 1 to authorize ProSe services between UEs.

DETAILED DESCRIPTION

Proximity-based Services (ProSe) have become increasingly popular, with a concurrent increase in deployed infrastructure. Such services provide a mechanism for a first user of user equipment (UE) such as a mobile phone or a similar device, to discover the presence of a second user within geographical proximity to the first user. Direct exchange of data and/or voice communications may then be enabled between the users, bypassing public commercial wireless networks.

ProSe communications may be especially beneficial to the delivery of public safety (PuSa) services. Public safety service personnel may have a need to communicate directly with other safety personnel during a wireless network service interruption, or in an environment in which connection to the wireless network is unreliable or impossible. However, it may be desirable or necessary to limit the discovery of PuSa personnel communications devices only to other PuSa personnel, e.g. to avoid distractions or congestion of direct communications. Currently known ProSe service definitions do not provide for the ability of PuSa service providers to limit their discoverability to only other PuSa service providers. Lack of such a capability represents a critical gap is PuSa communications protocols. Embodiments described herein address this need, but are not limited to such public safety applications unless explicitly stated.

Embodiments described herein provide apparatus, systems and methods to support PuSa UE communication for ProSe via presence information. Within a framework described below, a first UE associated with a first PuSa presentity may publish PuSa ProSe-specific information of the presentity in a presence document to a Presence Server (PS). When a watcher, e.g. a second PuSa presentity, subscribes to the first presentity's presence information, the PS may check PuSa ProSe authorization rules that define allowed communications among PuSa presentities. In the event that the request conforms to the rules, the ProSe information of the first PuSa presentity will be sent to the UE of the second PuSa presentity. The first and second PuSa presentities may then communicate with each other via a direct wireless link, e.g. via dedicated PuSa radio frequencies independent of a commercial wireless network.

Figure 1:
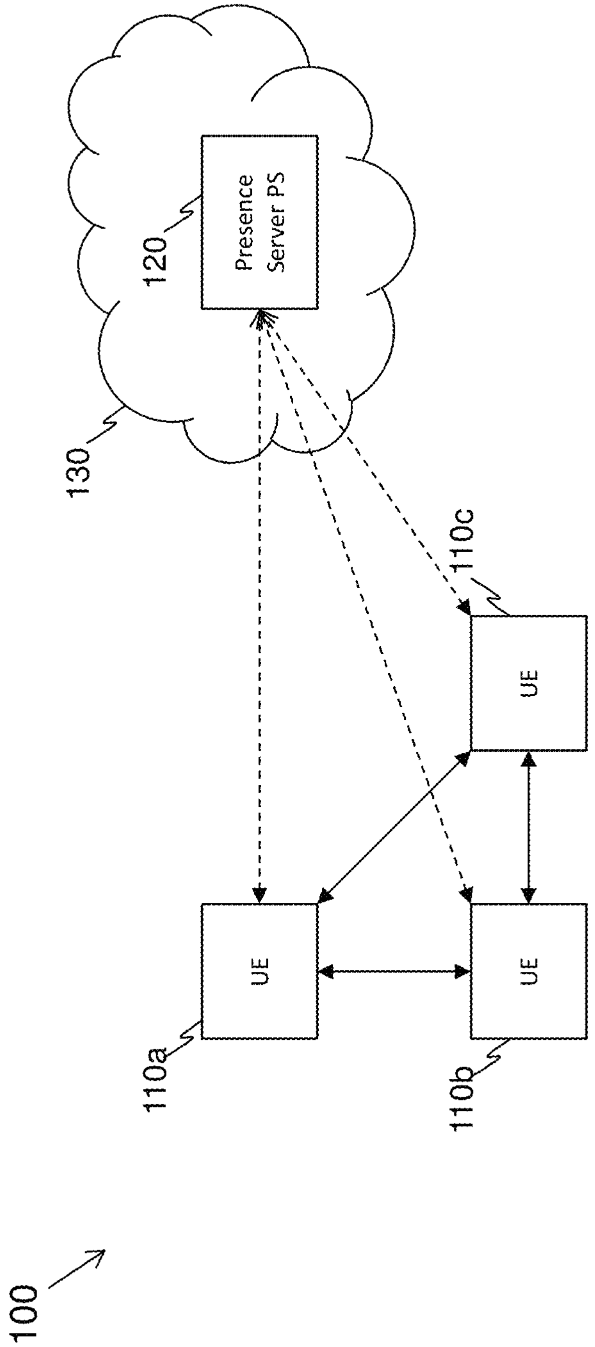
FIG. 1 presents an embodiment illustrating several UE devices intercommunicating directly with each other and with a ProSe presence server.

FIG. 1 illustrates a system 100 including devices configured to implement ProSe communication in accordance with various the principles of the invention. Three portable communication devices are illustrated, UEs 110*a*, 110*b* and 110*c*. Each UE 110 may be associated with a corresponding presentity, e.g. a PuSa service provider. The UEs 110*a*, 110*b*, 110*c* may each communicate with a presence server (PS) 120 that may operate within a publically accessible network 130 such as a telecom network that connects to the Internet, or a WiFi hotspot. The connection between the UEs 110 and the PS 120 may be by any type of wireless telecommunications network standard, e.g. global system for mobile communications (GSM), 3$^{rd}$ generation partnership project (3GPP) or Long-Term Evolution (LTE), or WiFi standard such as 802.11 in any of its several iterations. In addition to the ability to communicate with the PS 120, the UEs 110*a*, 110*b*, 110*c* may also communicate directly with each other, e.g. wirelessly.

In the system 100, each of the UEs 110 may operate as a watcher UE, associated with a watcher presentity, and/or a target UE associated with a target presentity. In the following description, references to a watcher UE are made with reference to the UE 110A, while references to a target UE are made with reference to the UE 110B. Those skilled in the pertinent art will appreciate that this may be viewed as an arbitrary assignment, and that any of the UEs 110 may be configured to operate as a watcher UE and/or a target UE.

Figure 2:
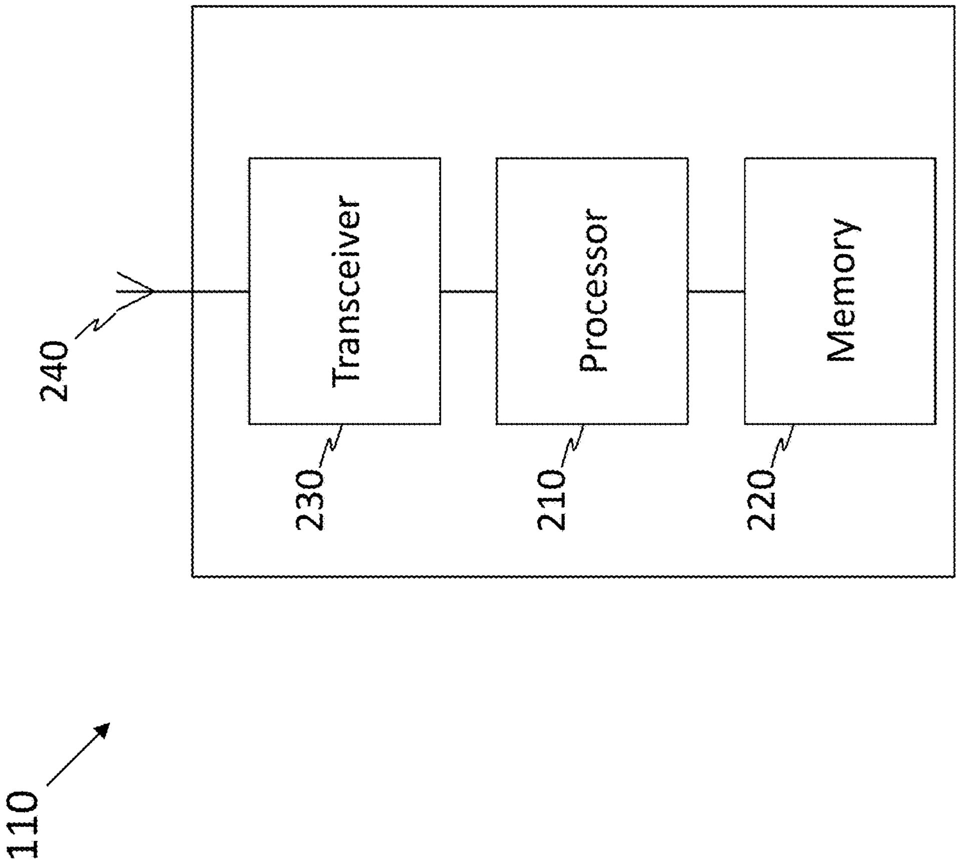
FIG. 2 illustrates an embodiment of a mobile device, e.g. user equipment, that may be may be used in the embodiment of FIG. 1.

FIG. 2 illustrates schematically an embodiment of the UE 110, including a processor 210 operably coupled to a memory 220 and a transceiver 230. Each of the processor 210, memory 220 and transceiver 230 may be configured to provide functionality consistent with embodiments within the scope of the disclosure, and may otherwise be any conventional or future-developed type. The memory 220 includes a non-transitory physical instruction space that holds operating instructions executed by the processor 210 according to such embodiments. These instructions may include such instructions to implement operation that conforms to various telecommunications standards, e.g. GSM, 3GPP or LTE, or WiFi standards such as 802.11. The instructions also encode operation consistent with peer-to-peer communication, e.g. device-to-device (D2D) functionality as described by 3GPP release 12, incorporated herein by reference in its entirety. The processor 210 is configured to control the transceiver 230 to communicate, via an antenna 240, with an internet access point, e.g. a mobile network tower, and with other instances of the UE 110, e.g. any of the UE 110*a*, 110*b*, 110*c* of FIG. 1. The antenna 240 is not limited to any particular type, and may include multiple antenna elements to implement MIMO communication.

Figure 3:
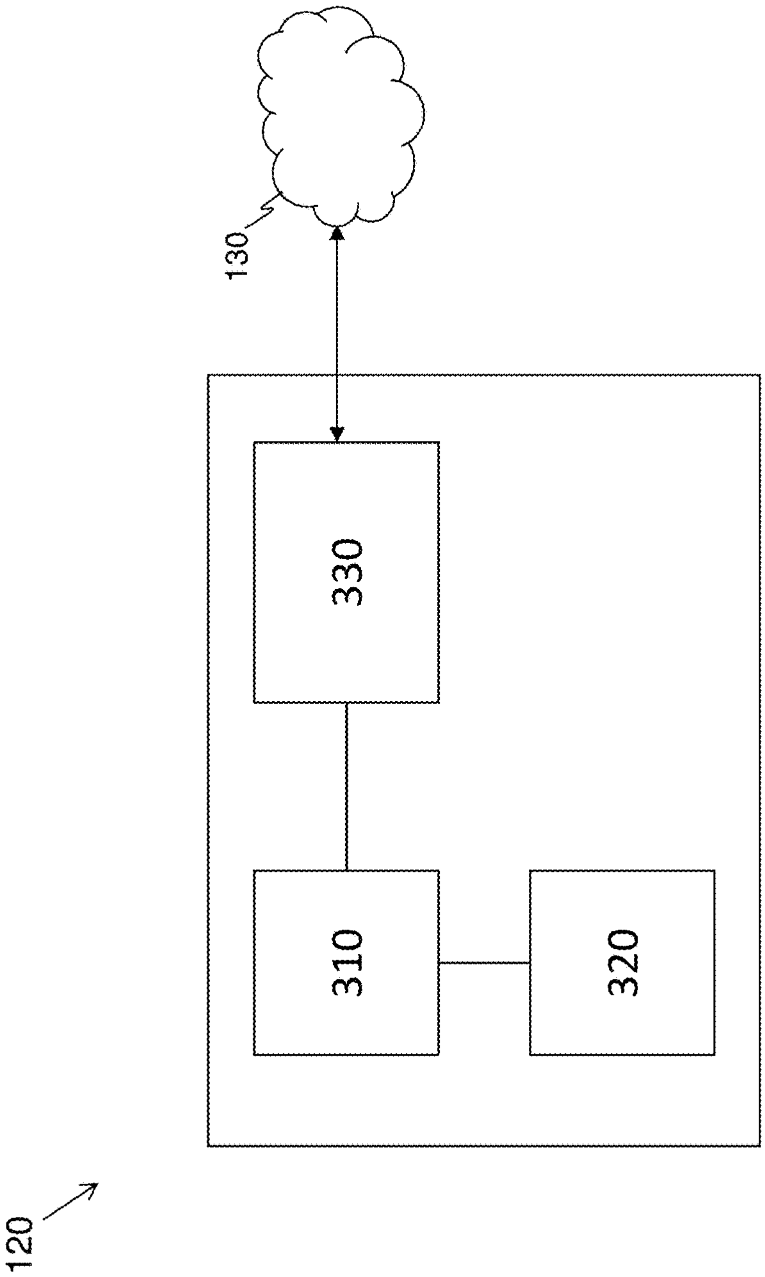
FIG. 3 illustrates an embodiment of a presence server that may be may be used in the embodiment of FIG. 1.

FIG. 3 illustrates one example embodiment of the presence server 120, including a processor (CPU) 310, a memory 320 and a network interface 330. The memory 320 includes nontransitory memory space that is readable by the processor 310, and may include any combination of, e.g., RAM, ROM and disc storage to support the functions described herein. The memory 320 may include instructions accessible to and executed by the processor 310 that when executed by the processor 310 configure the processor 310 to implement one or more embodiments described herein. The network interface 330 may include any conventional or novel functionality to communicate with network elements that enable communication with the UE 110, e.g. via a mobile communication system infrastructure, e.g. the network 130.

Figure 4:
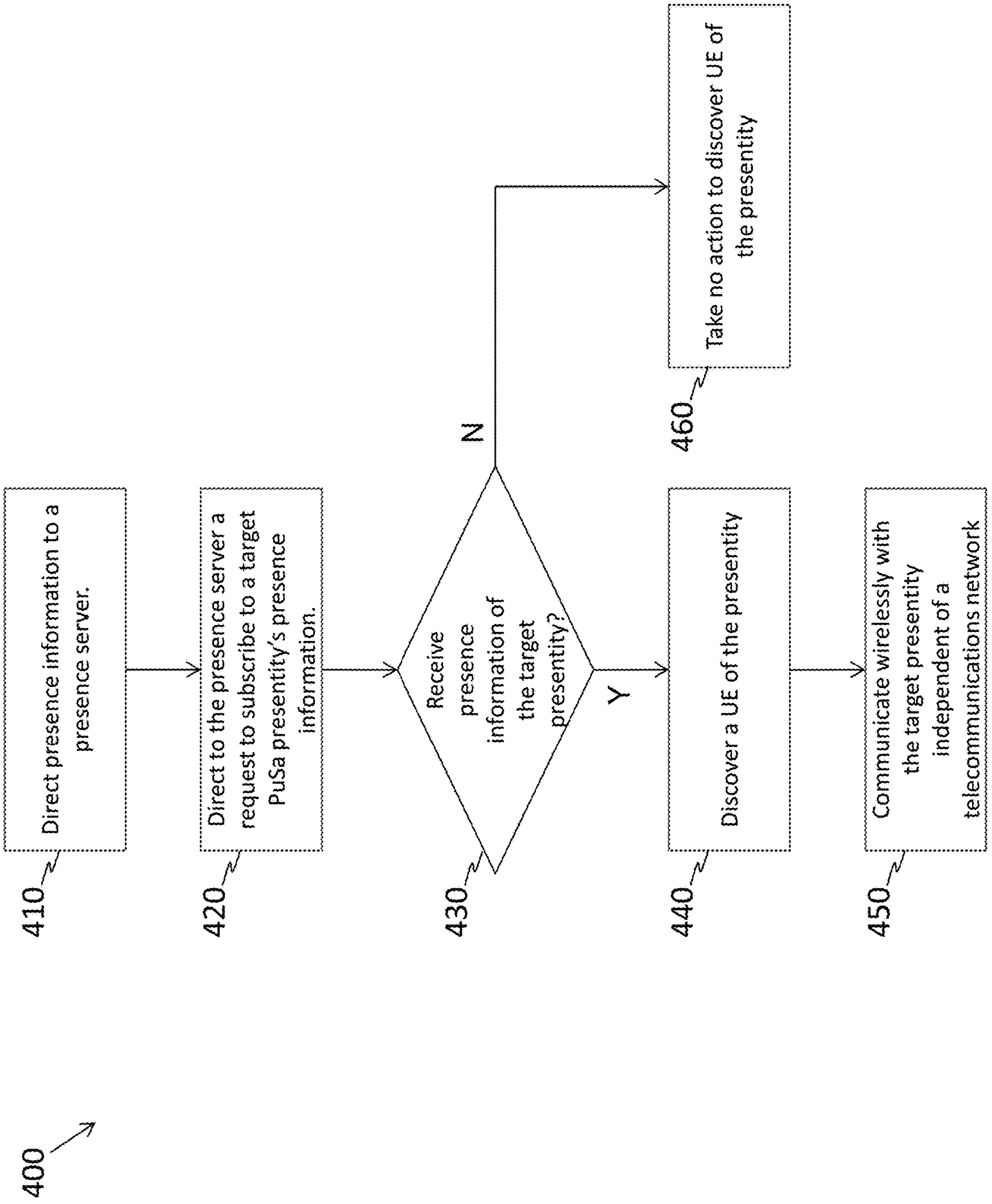
FIG. 4 presents a flow chart of a method that may be performed by a UE to communicate with a PuSa presentity, such as between UEs of FIG. 1.

FIG. 4 illustrates a method 400 according to an example embodiment that may be performed by a UE, e.g. the UE 110*a*. The steps of the method 400 are presented without limitation to other steps that may be optionally performed.

In a step 410 the UE 110*a* directs presence information to a presence server, e.g. the presence server 120. Those skilled in the pertinent art will appreciate that a first presentity device, e.g. the UE 110*a*, may transmit a presence document to a presence server, e.g. the PS 120, wherein the presence document includes various data that the presence server may use to communicate the presence of the first presentity device to a second presentity device, e.g. the UE 110*b*. In this context the UE 110*b* acts as the watcher UE and the UE 110*a* operates as the target UE. In the remainder of the discussion of the methods 400 and 600, the watcher and target UEs may be referred to as such without limitation thereto. In addition to any conventional data included in the presence document, in embodiments consistent with the disclosure the first presentity device also includes PuSa-specific information. In a nonlimiting embodiment, the first presentity device includes two PuSa-specific ProSe service IDs for ProSe services. The PuSa-specific information may include these additional service IDs, or any number of other similar PuSa-specific service IDs. A first service ID, e.g. xxxx.ProSe, may be applicable to normal commercial usage, e.g. non-PuSa related services. In this example, "xxxx" may be a string determined by a standard body or service provider. For example if the service ID were standardized by 3GPP, the xxxx string may be relevant to "org.3gpp.urn:urn-7", in which case the first service ID may be org.3gpp.urn:urn-7.ProSe. If the service ID were to be standardized by the Open Mobile Alliance, the xxxx string would be relevant to "org.openmobilealliance", in which case the first service ID could be org.openmobilealliance.ProSe. Continuing with the present example, a second service ID, e.g. xxxx.PuSa-ProSe, is only applicable to PuSa presentities. The "xxxx" prefix may be determined as previously described.

With continued reference to step 410, the UE associated with a first PuSa ProSe presentity, e.g. UE 110*a*, includes in the presence document PuSa-specific ProSe information. Such information generally includes one or more parameters associated only with PuSa service providers (presentities). More specifically, without limitation, the PuSa-specific ProSe information may include a ProSe service ID parameter that is only assigned to PuSa presentities, but not to the general public. In a more specific example, the PuSa-specific ProSe information may include a service tuple dedicated for PuSa ProSe service. The service tuple includes a PuSa ProSe service ID that is specific to the UE used by the service provider, the current geo-location of that UE, and a time-stamp. Thus, the tuple may appear as (service_ID, (latitude, longitude), time). Optionally, the PuSa ProSe presentity UE, e.g. the UE 110*a*, may also include ProSe service information in the presence document if the PuSa UE also supports regular ProSe services that can be used to communicate with other regular ProSe users.

In a step 420 the UE associated with a watcher PuSa ProSe presentity, e.g. the UE 110*b*, directs to the PS 120 a request to subscribe to the presence information for the target presentity. This request may be implemented conventionally, e.g. as described by 3GPP release 12.

The PS 120 includes a global authorization rule for PuSa ProSe, which may be provisioned by a network service provider in cooperation with public safety coordinating authorities. The rule explicitly specifies the condition(s) under which a requester (watcher UE) will be permitted to receive presence information regarding the target PuSa presentity. For example, in some embodiments the rule may only authorize requests that originate from one of a set of permitted Internet domains, e.g. domains associated with public safety organizations. In other embodiments the rule may block requests that originate from a set of excluded Internet domains. A rule that operates in the former manner is referred to herein as an permission rule, while a rule that operates in the latter manner is referred to as a prohibition rule. The PS 120 processes the request from the watcher UE 110*b* consistent with the rule to determine whether to grant the request.

FIG. 5 presents an example of such a permit authorization rule in a nonlimiting embodiment. The example rule is rendered in extensible markup language (XML) code, though any suitable data structure may be used, such as alternative markup languages, e.g. "Yet Another Markup Language" (YAML), and programming languages such as C and PERL. Those skilled in the pertinent art will immediately recognize the function of the lines in the example rule. Briefly described, line 501 is an XML header that specifies XML version and encoding type. Line 505 specifies an XML namespace of the rule document, e.g. "pres-rules". Line 509 specifies an XML scheme, e.g. "common-policy". Lines 517-597 embody the rule, e.g. "rule-1". Lines 521-549 define conditions that limit the limit the granting of ProSe services only to those requesters within a set of authorized requesters, e.g. other PuSa service providers. In the illustrated example, two domains are included, domain-x and domain-y. These domains may normally indicate the Internet domain from which the ProSe request originates. Thus, requests by watcher presentities from these domains may be granted access to the presence information of the target presentity. Lines 553-561 define an action that is performed in the event the condition is met, e.g. "allow" ProSe services. Lines 565-593 define a service descriptor for the allowed ProSe services, e.g. "PuSa-ProSe". In particular, line 577 includes the PuSa-ProSe service ID "xxxx.PuSa-ProSe" previously described. This service descriptor defines, in this example, the limitation that only a watcher that provides this service ID is permitted to subscribe to the ProSe presence information of the target presentity. As further described earlier, this service ID may take any desired form, and is only provisioned to authorized PuSa personnel to restrict access to PuSa ProSe services to those personnel.

If the permit authorization rule is satisfied, and the subscribing (watcher) presentity includes the correct service ID, the PS 160 will pass the PuSa-ProSe service information of the target presentity to the watcher/requester. Otherwise the PS 160 may filter out PuSa-ProSe services from the services otherwise available to the watcher. Thus in this case the watcher will not receive the PuSa-ProSe service information of the target presentity.

In some embodiments the authorization rule is expressed as a "prohibit authorization" rule, in which the limitations on distribution of ProSe presence information are expressed as exclusions. For example, the rule of FIG. 5 could be expressed as a prohibit rule by replacing "domain" in lines 533 and 537 with "except domain", replacing "allow" in line 557 with "prohibit", and replacing "provide-services" with "do-not-provide-services" in line 569. In some embodiments, a combined rule file may be constructed that includes permit rules and prohibit rules to precisely control access to the ProSe service information of the target presentity.

Returning to FIG. 4, in a step 430 the requesting UE, e.g. the watcher UE 110*b*, either receives the requested presence information, or fails to receive this information. The indication of failure is not limited to any particular form, which may include an expiration of a time period within which a response is expected, or may include a message from the PS 120 explicitly indicating refusal to provide the presence information. In the event that the watcher UE 110*b* receives the presence information regarding the target UE 110*a*, the method 400 proceeds to a step 440 in which the watcher UE 110*b* uses the received presence information to discover the presence of the target UE 110*a*.

The method 400 may optionally proceed to a step 450 in which the watcher UE 110*b* communicates with the target UE 110*a* via a ProSe-based message. This may include determining if the target PuSa presentity is within the radio signal coverage of the requesting presentity based on the geo-location information of the target PuSa presentity that was included in the tuple delivered to the presence server in the step 410. If the target presentity is within range the requesting presentity may request to communicate wirelessly with the target presentity independent of a telecommunications network. Optionally the wireless communication is via dedicated PuSa radio frequencies. If the presence information is not received in the step 430, the method 400 advances to a step 460 in which no action is taken to discover the presence of the target UE.

Figure 6:
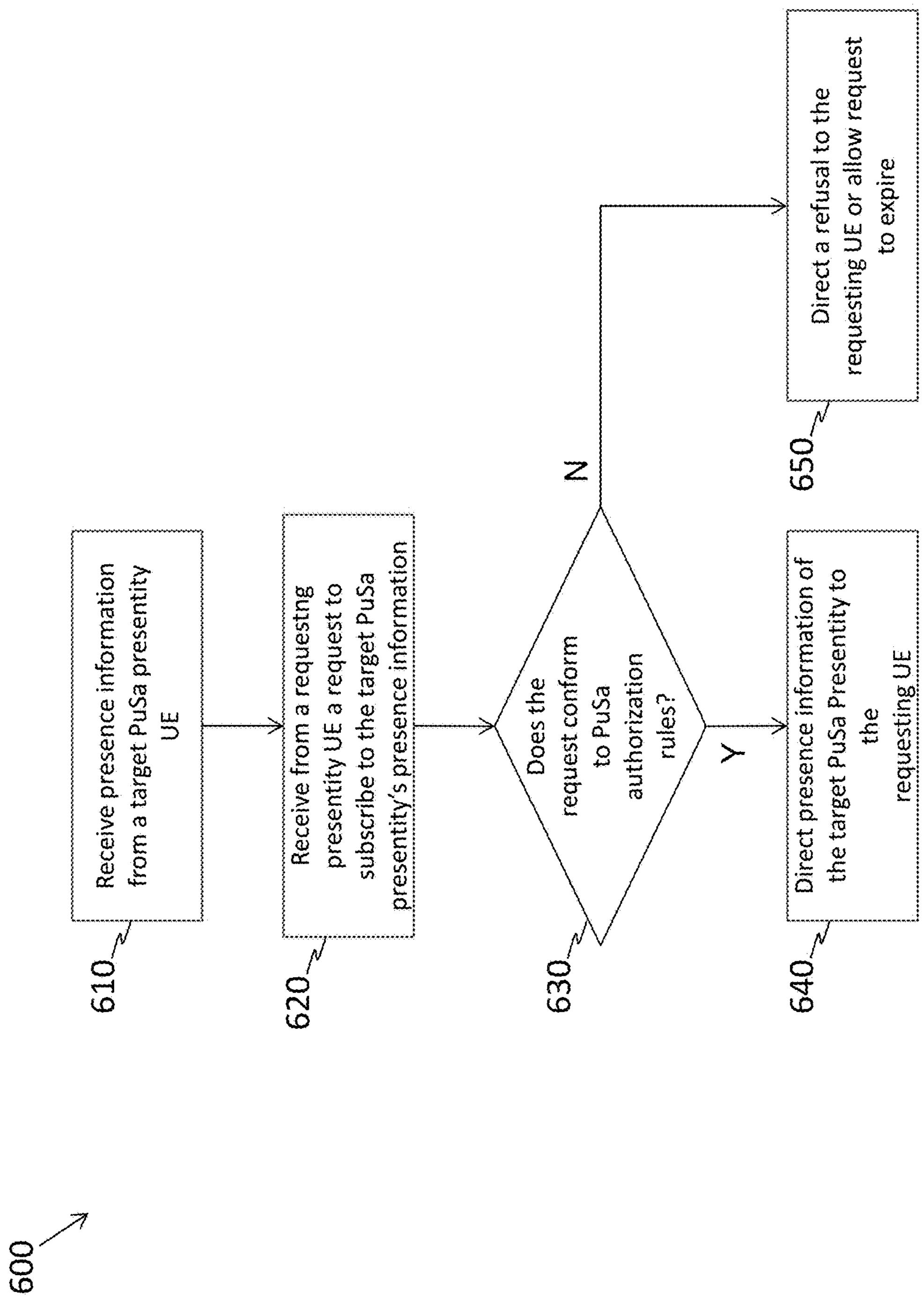
FIG. 6 presents a flow chart of a method that may be performed by the ProSe server of FIG. 1 to authorize ProSe services between PuSa presentities.

FIG. 6 illustrates a method 600 that may be performed at a presence server, e.g. the PS 120. The method 600 may be initiated in response to a presence request from a watcher UE, e.g. the UE 110*b*, and include communication between the PS 120 and a UE associated with a target PuSa presentity, e.g. the UE 110*a*.

In a step 610 the PS 120 receives from the target UE 110*a* presence information regarding the target presentity. In a step 620 the PS 120 receives from the watcher UE 110*b* a request to subscribe to presence information regarding the target UE 110*a*. In a step 630 the PS 120 determines if the subscription request conforms to a rule or rules that govern the establishment of ProSe services between PuSa presentities as previously described. In various embodiments this step also includes verifying that the requesting UE 110*b* is a PuSa ProSe user, such as by determining that the watcher and target UEs are in a same logical domain. In the event that the request conforms, in a step 640 the presence server directs the presence information of the target presentity to the watcher UE 110*b*. If instead at the step 630 the PS 120 determines if the subscription fails to conform to the rule(s), the method proceeds to a step 650 in which the PS 120 directs a refusal to the watcher UE 110*b* or allows the request for ProSe services to expire.

In various embodiments the watcher UE 110*b* supports a graphical user interface (GUI) menu button that when selected displays the UEs of all target PuSa ProSe presentities that are within the radio coverage of the watcher UE 110*b*. Such presentities may be displayed either in a list or on a map according to the geo-location associated with each target PuSa ProSe presentity. The list and/or the map may be dynamic, in that the watcher UE 110*b* may update the list or the map as target presentities enter or leave the radio coverage area. Optionally the list and/or map is functionally active, in that the presentity may actuate, e.g. touch, a list or map entry to initiate communication with the selected target presentity. The UE may be further configured such that a second actuation of the list or map entry causes the ProSe connection to terminate. In various embodiments the watcher UE 110*b* includes the capability to include data files, still images and/or video images for direct communication between the PuSa ProSe presentities.

Although multiple embodiments of the present invention have been illustrated in the accompanying Drawings and described in the foregoing Detailed Description, it should be understood that the present invention is not limited to the disclosed embodiments, but is capable of numerous rearrangements, modifications and substitutions without departing from the invention as set forth and defined by the following claims.

The invention claimed is:

1. An apparatus, comprising:

a processor; and a computer-readable nontransitory storage medium operably coupled to said processor and including instructions that when executed by the processor configure the processor to:

direct presence information toward a presence server (PS), the presence information including public-safety (PuSa) specific proximity-based services (ProSe) information; and direct to the PS a request to subscribe to a target presentity's PuSa-specific ProSe information, the request including a dedicated PuSa service identification (ID).

2. The apparatus of claim 1, wherein said processor is further configured by said instructions to:

discover user equipment (UE) of said target presentity only on the condition that the PS returns said PuSa-specific ProSe information of said target presentity.

3. The apparatus of claim 2, wherein said processor is further configured by said instructions to communicate with said UE directly via a radio-frequency link independent of a telecommunications network.

4. The apparatus of claim 3, wherein said link is via a dedicated public safety frequency.

5. The apparatus of claim 1, wherein said proximity-based information includes a PuSa-ProSe service ID of the target presentity, geo-location data, and a timestamp.

6. The apparatus of claim 1, wherein said instructions further configure the processor to display a list or a map that indicates the presence of the target presentity.

7. A method, comprising:

configuring a mobile computing device to direct presence information toward a presence server (PS), the presence information including public-safety (PuSa) specific proximity-based services (ProSe) information; and configuring the mobile computing device to direct to the PS a request to subscribe to a target presentity's PuSa-specific ProSe information, the request including a dedicated PuSa service identification (ID).

8. The method of claim 7, further comprising:

configuring the mobile computing device to discover user equipment (UE) of said target presentity only on the condition that the PS returns said PuSa-specific ProSe information of said target presentity.

9. The method of claim 8, further comprising configuring the processor to direct a communication to said target UE via a radio-frequency link independent of a telecommunications network.

10. The method of claim 9, wherein said radio-frequency link is via a dedicated public safety frequency.

11. The method of claim 7, wherein said proximity-based information includes geo-location data.

12. The method of claim 7, further comprising configuring the processor to display a list or a map that indicates the presence of the target presentity.

13. An apparatus, comprising:

a processor; and a computer-readable nontransitory storage medium operably coupled to said processor and including instructions that when executed by the processor configure the processor to:

receive, from a target user equipment (UE), presence information, including public-safety (PuSa) specific proximity-based services (ProSe) information;

receive, from a watcher UE, a request to subscribe to said presence information; and direct said presence information to said watcher UE on the condition that said watcher presentity is determined to be a PuSa ProSe user based on PuSa subscription rules.

14. The apparatus of claim 13, wherein said presence information includes an identity (ID) of said target UE, a geo-location and a time stamp.

15. The apparatus of claim 13, wherein said PuSa subscription rules are defined by XML code.

16. The apparatus of claim 13, wherein said PuSa subscription rules include a definition of a service identity specific to authorized PuSa presentities.

17. The apparatus of claim 13, wherein said PuSa subscription rules include a definition of a service identity applicable to non-PuSa ProSe service.

18. A method, comprising:
configuring a server to:
receive, from a target user equipment (UE), presence information, including public-safety (PuSa) specific proximity-based services (ProSe) information;
receive, from a watcher UE, a request to subscribe to said presence information; and
direct said presence information to said watcher UE on the condition that said watcher presentity is determined to be a PuSa ProSe user based on PuSa subscription rules.

19. The method of claim 18, wherein said presence information includes an identity (ID) of said target UE, a geo-location and a time stamp.

20. The method of claim 18, wherein said PuSa subscription rules are defined by XML code.

21. The method of claim 18, wherein said PuSa subscription rules include a definition of a service identity (ID) specific to authorized PuSa presentities.

22. The method of claim 18, wherein said PuSa subscription rules include a definition of a service ID applicable to non-PuSa ProSe service.

* * * * *